US012597681B2

(12) United States Patent
Wakimoto

(10) Patent No.: US 12,597,681 B2
(45) Date of Patent: Apr. 7, 2026

(54) SECONDARY BATTERY COMPRISING INSULATED TAB GROUP

(71) Applicant: SANYO Electric Co., Ltd., Osaka (JP)

(72) Inventor: Ryoichi Wakimoto, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 535 days.

(21) Appl. No.: 17/635,903

(22) PCT Filed: Sep. 11, 2020

(86) PCT No.: PCT/JP2020/034402
§ 371 (c)(1),
(2) Date: Feb. 16, 2022

(87) PCT Pub. No.: WO2021/060007
PCT Pub. Date: Apr. 1, 2021

(65) Prior Publication Data
US 2022/0302559 A1      Sep. 22, 2022

(30) Foreign Application Priority Data

Sep. 26, 2019    (JP) ................................. 2019-175471

(51) Int. Cl.
*H01M 50/54* (2021.01)
*H01M 50/184* (2021.01)

(52) U.S. Cl.
CPC ......... *H01M 50/54* (2021.01); *H01M 50/184* (2021.01)

(58) Field of Classification Search
CPC ............................ H01M 50/54; H01M 50/184
See application file for complete search history.

(56) References Cited

U.S. PATENT DOCUMENTS

2002/0061435 A1*   5/2002   Hisai ................. H01M 10/0431
                                                                429/211
2008/0060189 A1*   3/2008   Daidoji ............... H01M 50/566
                                                                29/623.1
(Continued)

FOREIGN PATENT DOCUMENTS

JP        2010-118315 A      5/2010
JP        2011-070917 A      4/2011
(Continued)

OTHER PUBLICATIONS

Extended European Search Report issued in corresponding European Patent Application No. 20869335.8, dated Feb. 13, 2023.
(Continued)

*Primary Examiner* — Basia A Ridley
*Assistant Examiner* — Jonathan William Estes
(74) *Attorney, Agent, or Firm* — Rimon P.C.

(57) ABSTRACT

A secondary battery includes an exterior body housing the electrode body, an external terminal provided outside a sealing plate sealing an opening of the exterior body, a connection member provided inside the sealing plate and connected to the external terminal, an insulating member provided between the sealing plate and the connection member, and a current collector disposed inside the sealing plate and connected to the connection member and a tab group including a plurality of current collector tabs extending from the electrode body. At least some of the current collector tabs of the tab group have a projecting portion projecting from the current collector in a longitudinal direction of the sealing plate. The insulating member has an extending portion at least extending between the projecting portion and the sealing plate along the longitudinal direction of the sealing plate.

10 Claims, 11 Drawing Sheets

(56)                    References Cited

U.S. PATENT DOCUMENTS

| | | | |
|---|---|---|---|
| 2010/0124694 | A1 | 5/2010 | Hikata et al. |
| 2018/0019448 | A1 | 1/2018 | Shimizu et al. |
| 2018/0047971 | A1 | 2/2018 | Hirose et al. |
| 2019/0044102 | A1 | 2/2019 | Ogawa et al. |
| 2019/0267665 | A1* | 8/2019 | Wakimoto .......... H01M 50/566 |

FOREIGN PATENT DOCUMENTS

| | | | | |
|---|---|---|---|---|
| JP | 2018-170097 | A | 11/2018 | |
| JP | 2018-534725 | A | 11/2018 | |
| WO | 2016/147955 | A1 | 9/2016 | |
| WO | WO-2018021371 | A1 * | 2/2018 | ........... H01M 10/04 |
| WO | 2015163230 | A1 | 1/2019 | |

OTHER PUBLICATIONS

International Search Report issued in International Patent Application No. PCT/JP2020/034402, dated Dec. 1, 2020, with English translation.

* cited by examiner

SECONDARY BATTERY COMPRISING INSULATED TAB GROUP

CROSS-REFERENCE OF RELATED APPLICATIONS

This application is the U.S. National Phase under 35 U.S.C. § 371 of International Patent Application No. PCT/JP2020/034402, filed on Sep. 11, 2020, which in turn claims the benefit of Japanese Application No. 2019-175471, filed on Sep. 26, 2019, the entire disclosures of which Applications are incorporated by reference herein.

TECHNICAL FIELD

The present disclosure relates to a secondary battery.

BACKGROUND ART

As a current collection structure of a secondary battery configured such that an electrode body is housed in an exterior body, a structure has been known, in which a current collector tab extending from the electrode body toward a sealing plate of the exterior body is connected to an external terminal through a current collector.

Regarding such a current collection structure, Patent Document 1 discloses, as an electrode body, a structure in which a positive electrode plate and a negative electrode plate are wound in a flat shape with a separator being interposed therebetween. Each of the positive electrode plate and the negative electrode plate is formed in a band shape, and a plurality of positive and negative electrode current collector tabs is formed at predetermined intervals at one end portion in a width direction. When the positive electrode plate and the negative electrode plate are wound to form the electrode body, the plurality of positive and negative electrode current collector tabs are stacked at predetermined positions to form tab groups. Each of the positive and negative electrode tab groups is bundled, and these tab groups are each connected to positive and negative electrode current collectors. The current collectors are further connected to external terminals to form the current collection structure.

CITATION LIST

Patent Document

PATENT DOCUMENT 1: Japanese Unexamined Patent Application Publication (Translation of PCT Application) No. 2018-534725

SUMMARY OF THE INVENTION

In the above-described current collection structure, an insulating member is arranged between the current collector and the sealing plate for electrically insulating a sealing plate from the current collector connected to the external terminal.

For increasing the output of the secondary battery, it is effective to expand the width of the current collector tab in a longitudinal direction of the sealing plate. For expanding the width of the current collector tab, the region of the current collector connected to the tab group is also expanded. As a result, the tab group is arranged close to an end portion of the current collector in the longitudinal direction.

The plurality of current collector tabs are formed in advance at predetermined intervals at the end portions of the positive and negative electrode plates on one side so as to be stacked at predetermined positions when the positive electrode plate and the negative electrode plate are wound in a flat shape to form the electrode body. However, due to variation in the thicknesses of the electrode plates, the curvature of the wound electrode body, a pressing direction when the wound electrode body is pressed in the flat shape, etc., these current collector tabs are stacked at positions shifted from the predetermined positions in some cases.

When the tab group is connected to the current collector with the plurality of current collector tabs being shifted from each other as described above, some of the current collector tabs might project from the current collector in the longitudinal direction of the sealing plate. As a result, a portion of the current collector tab projecting from the current collector might contact the sealing plate, leading to a loss of insulation between the tab group and the sealing plate.

A secondary battery of the present disclosure includes an electrode body including a positive electrode plate and a negative electrode plate, an exterior body having an opening and housing the electrode body, a sealing plate sealing the opening, an external terminal provided outside the sealing plate, a connection member provided inside the sealing plate and connected to the external terminal, an insulating member provided between the sealing plate and the connection member, and a current collector disposed inside the sealing plate and connected to the connection member and a tab group including a plurality of current collector tabs extending from the positive electrode plate and the negative electrode plate. At least some of the current collector tabs of the tab group have a projecting portion projecting from the current collector in a longitudinal direction of the sealing plate. The insulating member has an extending portion at least extending between the projecting portion and the sealing plate along the longitudinal direction of the sealing plate.

According to the present disclosure, a secondary battery can be provided, which includes a current collector and has such a structure that insulation between a tab group including a plurality of current collector tabs and a sealing plate is maintained.

DESCRIPTION OF EMBODIMENT

Hereinafter, an embodiment of the present disclosure will be described in detail with reference to the drawings. Note that the present disclosure is not limited to the following embodiment. Further, changes can be made as necessary without departing from a scope in which advantageous effects of the present disclosure are provided.

Figure 1:
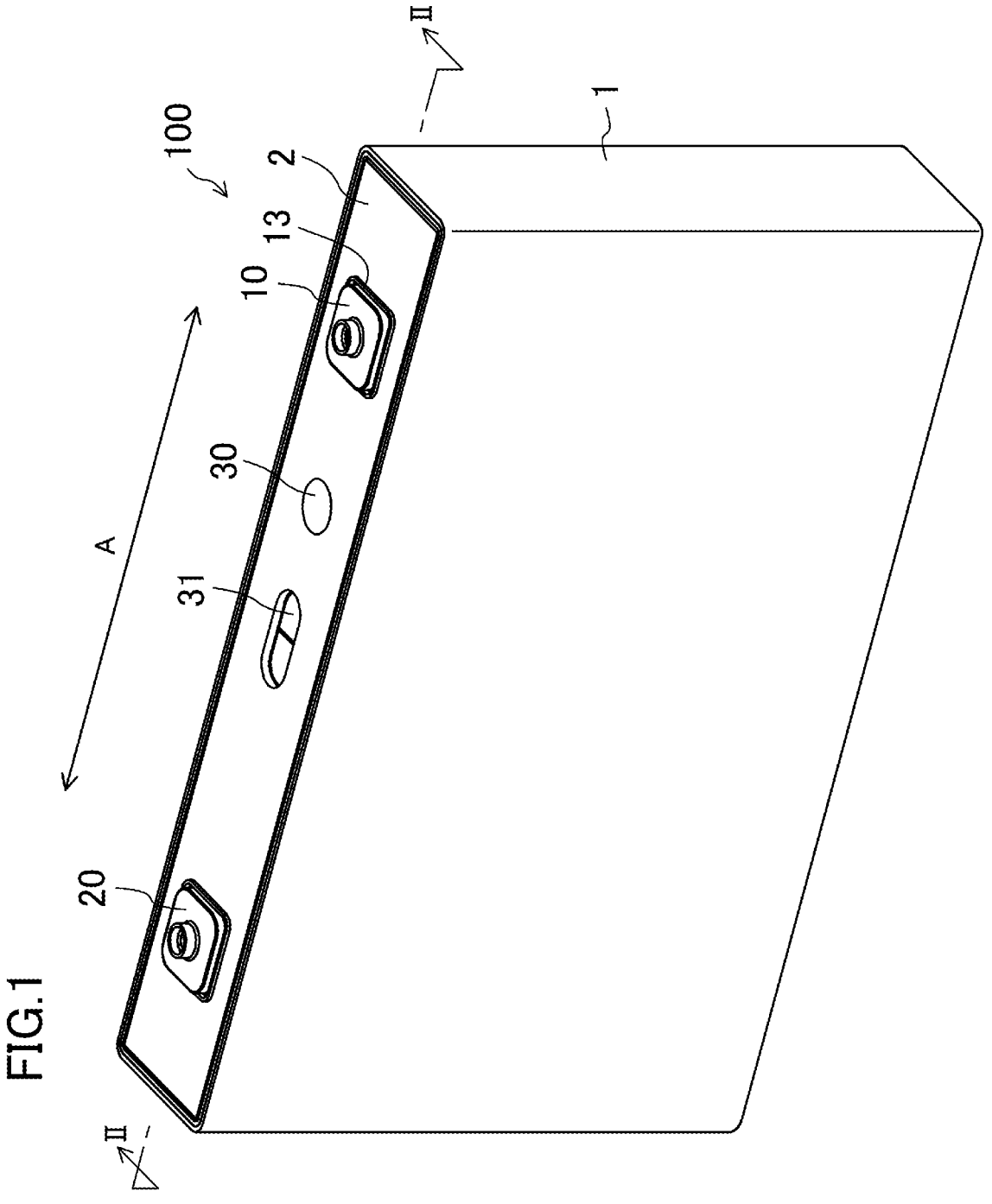
FIG. 1 is a perspective view schematically showing the configuration of a secondary battery in one embodiment of the present disclosure.

FIG. 1 is a perspective view schematically showing the configuration of a secondary battery according to one embodiment of the present disclosure. Moreover, FIG. 2 is a sectional view taken along line II-II of FIG. 1.

Figure 2:
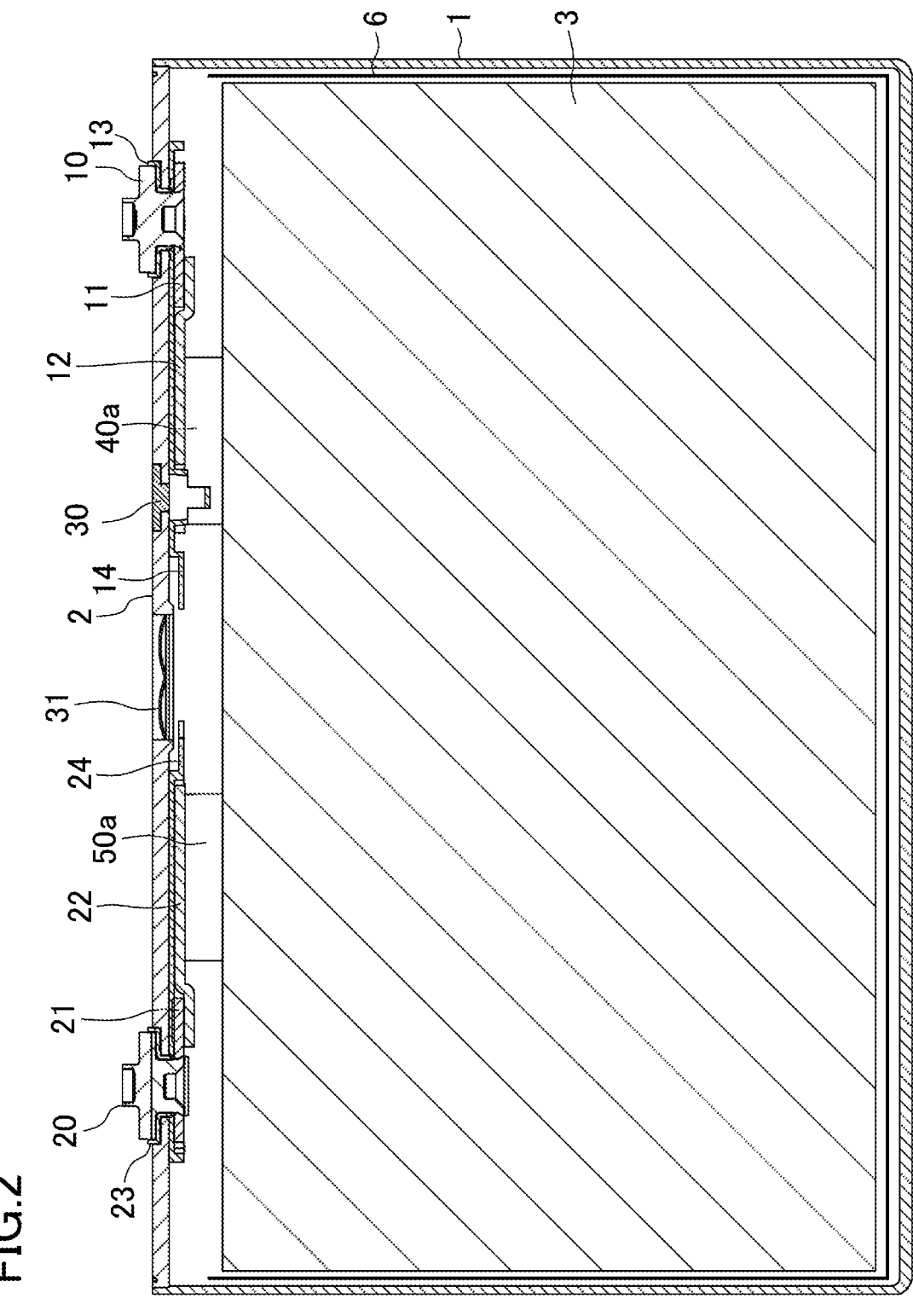
FIG. 2 is a sectional view taken along line II-II of FIG. 1.

As shown in FIGS. 1 and 2, a secondary battery 100 in the present embodiment includes an exterior body 1 having an opening and housing an electrode body 3 and a sealing plate 2 sealing the opening of the exterior body 1. The exterior body 1 and the sealing plate 2 are made of aluminum or aluminum alloy, for example. A positive electrode external terminal 10 and a negative electrode external terminal 20 are provided outside the sealing plate 2. The electrode body 3 has such a structure that a positive electrode plate and a negative electrode plate are wound in a flat shape with a separator being interposed therebetween. Note that in the present embodiment, a longitudinal direction of the sealing plate 2 indicates the direction of an arrow A in FIG. 1.

A positive electrode connection member 11 and a negative electrode connection member 21 respectively connected to the positive electrode external terminal 10 and the negative electrode external terminal 20 are provided inside the sealing plate 2. Further, a positive electrode current collector 12 and a negative electrode current collector 22 respectively connected to the positive electrode connection member 11 and the negative electrode connection member 21 are provided inside the sealing plate 2.

The electrode body 3 has, at an end portion thereof adjacent to the sealing plate 2, a positive electrode tab group 40a and a negative electrode tab group 50a respectively connected to the positive electrode plate and the negative electrode plate, each tab group including a plurality of current collector tabs. The positive electrode tab group 40a and the negative electrode tab group 50a are respectively connected to the positive electrode current collector 12 and the negative electrode current collector 22.

The positive electrode external terminal 10, the positive electrode connection member 11, and the positive electrode current collector 12 are made of aluminum or aluminum alloy, for example. The negative electrode external terminal 20, the negative electrode connection member 21, and the negative electrode current collector 22 are made of copper or copper alloy, for example.

An upper insulating member 13 is arranged between the positive electrode external terminal 10 and the sealing plate 2, and an upper insulating member 23 is arranged between the negative electrode external terminal 20 and the sealing plate 2. Moreover, an insulating member 14 is arranged between the positive electrode connection member 11 and the sealing plate 2, and an insulating member 24 is arranged between the negative electrode connection member 21 and the sealing plate 2. With this configuration, each of the positive electrode external terminal 10, the negative electrode external terminal 20, the positive electrode connection member 11, and the negative electrode connection member 21 is electrically insulated from the sealing plate 2.

The sealing plate 2 is provided with a liquid injection hole (not shown) for injecting an electrolytic solution, and the liquid injection hole is sealed with a sealing member 30. The sealing plate 2 is provided with a gas discharge valve 31, and when the internal pressure of the exterior body 1 reaches a predetermined value or greater, gas in the exterior body 1 is discharged to the outside through the broken gas discharge valve 31. An insulating electrode body holder 6 is arranged between the exterior body 1 and the electrode body 3.

Next, the method for assembling the secondary battery in the present embodiment and details of each configuration will be described with reference to FIGS. 3A to 9.

Figure 3A:
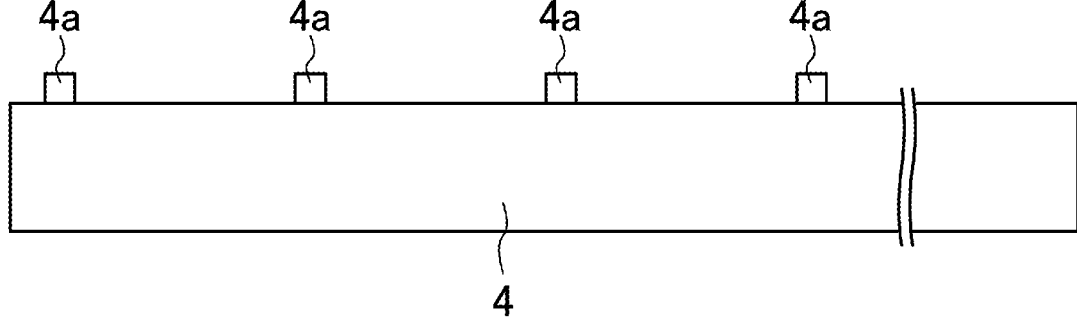
FIG. 3A is a plan view of a positive electrode plate.

FIG. 3A is a plan view of the positive electrode plate 4. The positive electrode plate 4 has such a configuration that positive electrode mixture layers containing a positive electrode active material are formed on both surfaces of a positive electrode core. A plurality of positive electrode current collector tabs 4a protrudes at predetermined intervals from an end side of the positive electrode plate 4. The positive electrode current collector tab 4a may be part of the positive electrode core, or may be another member. The positive electrode core is made of aluminum foil or aluminum alloy foil, for example. Moreover, the positive electrode active material is made of lithium-transition metal composite oxide, for example.

Figure 3B:
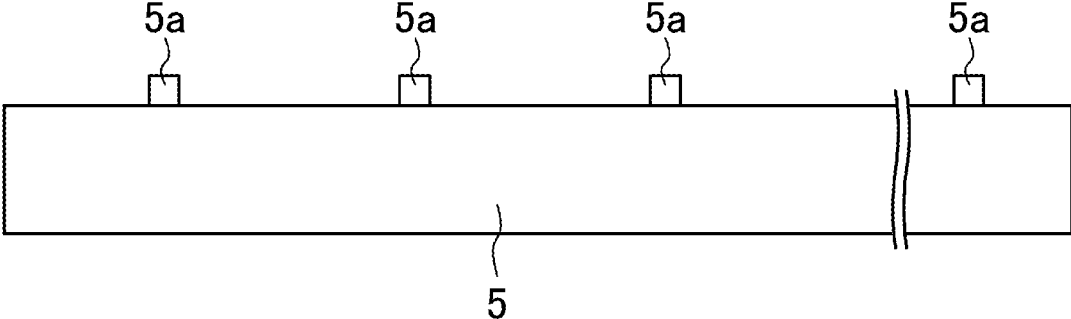
FIG. 3B is a plan view of a negative electrode plate.

FIG. 3B is a plan view of the negative electrode plate 5. The negative electrode plate 5 has such a configuration that negative electrode mixture layers containing a negative electrode active material are formed on both surfaces of a negative electrode core. A plurality of negative electrode current collector tabs 5a protrudes at predetermined intervals from an end side of the negative electrode plate 5. The negative electrode current collector tab 5a may be part of the negative electrode core, or may be another member. The negative electrode core is made of copper foil or copper alloy foil, for example. Moreover, the negative electrode active material is made of a carbon material or a silicon-containing material, for example.

Figure 4A:
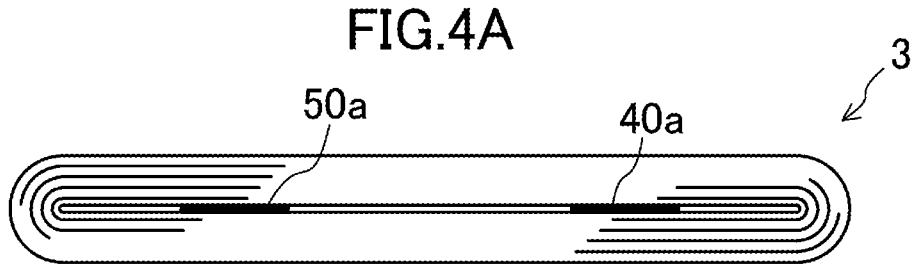
FIG. 4A is a top view of an electrode body.
Figure 4B:
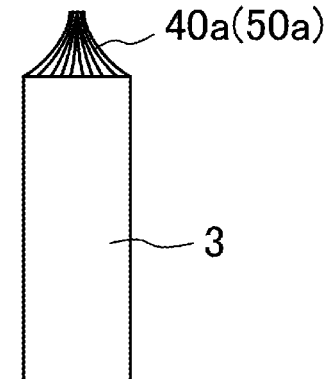
FIG. 4B is a side view of the electrode body.
Figure 4C:
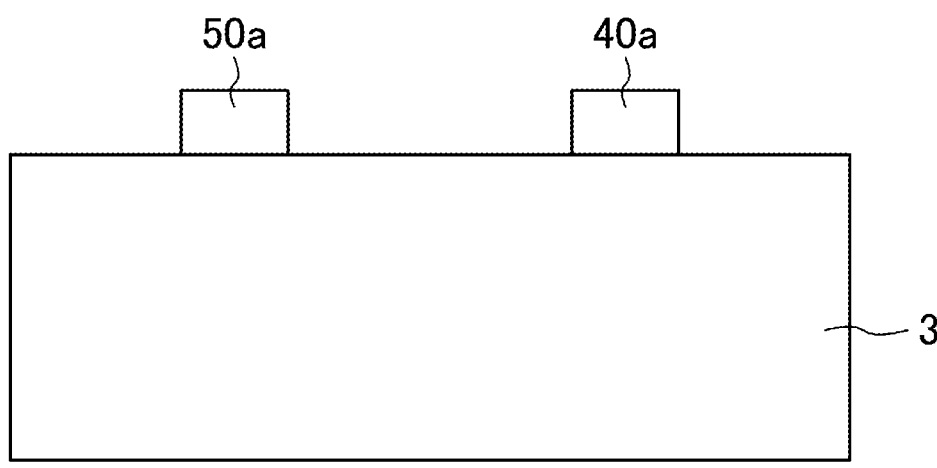
FIG. 4C is a front view of the electrode body.

FIGS. 4A to 4C show the electrode body 3 configured such that the positive electrode plate 4 and the negative electrode plate 5 are wound in a flat shape with a separator being interposed therebetween. Here, FIG. 4A is a top view of the electrode body 3, FIG. 4B is a side view of the electrode body 3, and FIG. 4C is a front view of the electrode body 3.

As shown in FIGS. 4A to 4C, the positive electrode tab group 40a and the negative electrode tab group 50a protrude from an end side of the electrode body 3. When the positive electrode plate 4 and the negative electrode plate 5 are wound in the flat shape to form the electrode body 3, the positive electrode tab group 40a and the negative electrode tab group 50a are configured such that a plurality of positive electrode current collector tabs 4a and a plurality of negative electrode current collector tabs 5a are stacked on each other at predetermined positions. Note that the positive electrode tab group 40*a* and the negative electrode tab group 50*a* are respectively connected to the later-described positive electrode current collector 12 and the later-described negative electrode current collector 22 with tip end portions of the positive electrode tab group 40*a* and the negative electrode tab group 50*a* being bundled together.

Figure 5:
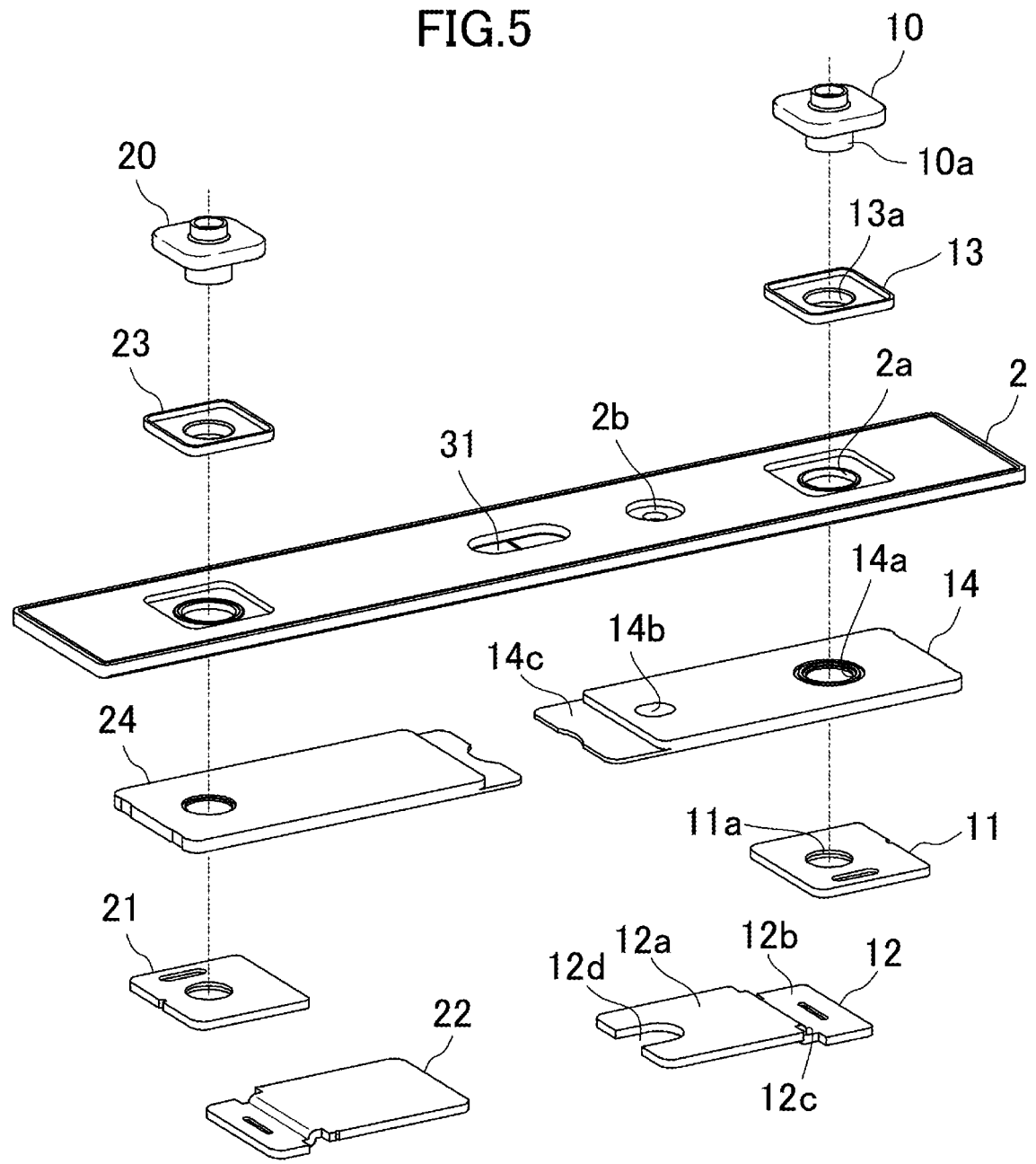
FIG. 5 is an exploded perspective view of each configuration of the secondary battery other than an exterior body and the electrode body.
Figure 6:
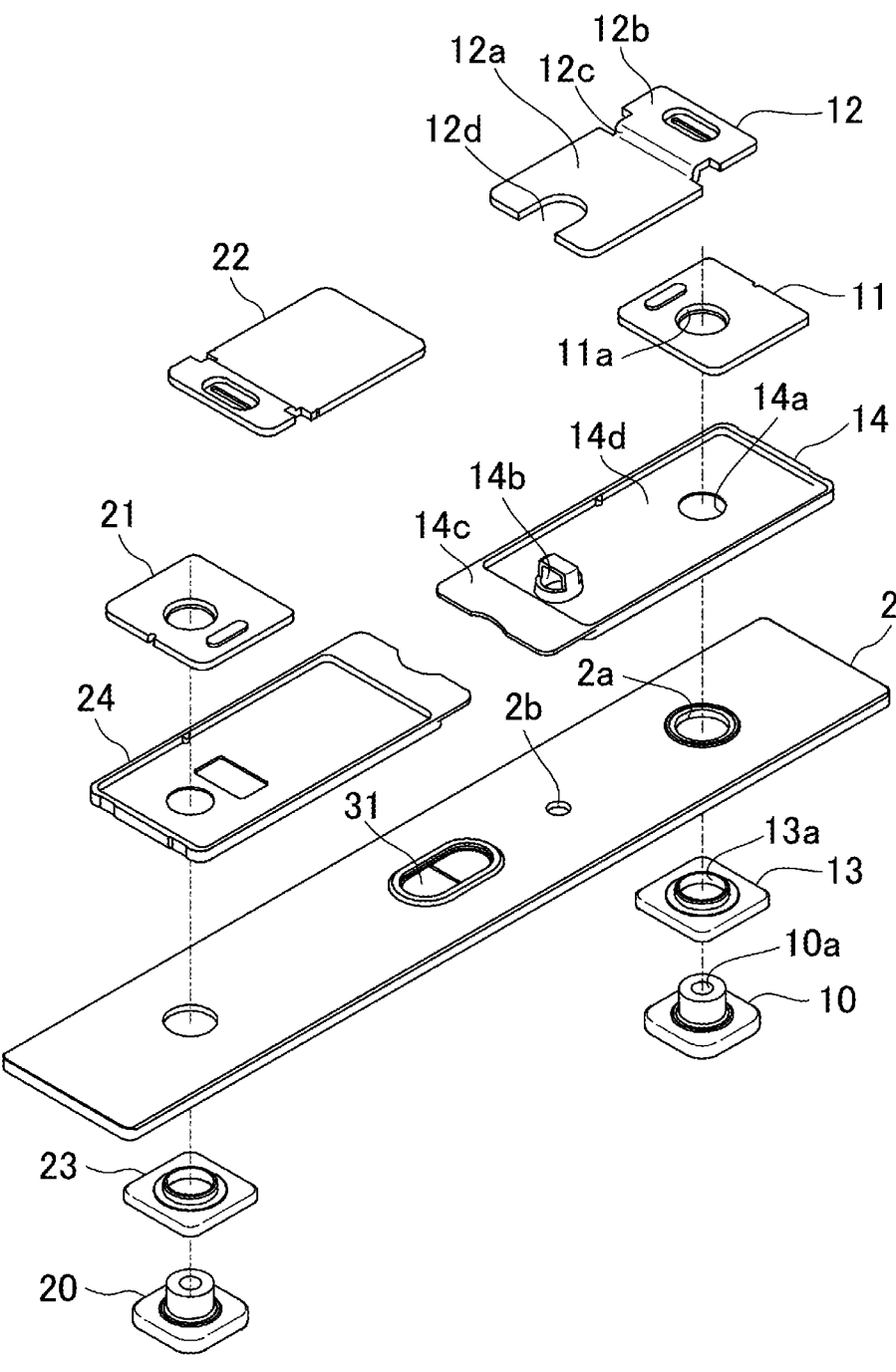
FIG. 6 is an exploded perspective view of each configuration of the secondary battery other than the exterior body and the electrode body.

FIGS. 5 and 6 are exploded perspective views of each configuration of the secondary battery other than the exterior body 1 and the electrode body 3. Here, FIG. 5 is an exploded perspective view from the upper side of the sealing plate 2, and FIG. 6 is an exploded perspective view from the lower side of the sealing plate 2. Note that each configuration on a positive electrode side will be described below and each configuration on a negative electrode side is basically the same as that on the positive electrode side.

As shown in FIGS. 5 and 6, the positive electrode external terminal 10 and the upper insulating member 13 are arranged on the upper side of the sealing plate 2. On the lower side of the sealing plate 2, the insulating member 14, the positive electrode connection member 11, and the positive electrode current collector 12 are arranged.

The positive electrode external terminal 10 has a cylindrical protruding portion 10*a*. The upper insulating member 13, the sealing plate 2, the insulating member 14, and the positive electrode connection member 11 are respectively provided with through-holes 13*a*, 2*a*, 14*a*, and 11*a* through which the protruding portion 10*a* of the positive electrode external terminal 10 penetrates.

The sealing plate 2 has a liquid injection hole 2*b* for injecting an electrolytic solution and a gas discharge valve 31 for discharging gas from the exterior body 1. The insulating member 14 is provided with an opening 14*b* at such a position that the liquid injection hole 2*b* is not closed.

The positive electrode current collector 12 has, along the longitudinal direction of the sealing plate 2, a first connection region 12*a* connected to the positive electrode tab group 40*a* and a second connection region 12*b* connected to the positive electrode connection member 11. The positive electrode current collector 12 has a step portion 12*c* between the first connection region 12*a* and the second connection region 12*b*, and the first connection region 12*a* is positioned closer to the sealing plate 2 than the second connection region 12*b* is. The positive electrode current collector 12 is provided with a cutout portion 12*d* at such a position that the liquid injection hole 2*b* is not closed.

Note that the insulating member 24 on the negative electrode side and the negative electrode current collector 22 are not arranged at such positions that the liquid injection hole 2*b* is closed, and therefore, do not have portions equivalent to the opening 14*b* and the cutout portion 12*d* respectively provided at the insulating member 14 and the positive electrode current collector 12.

Figure 7:
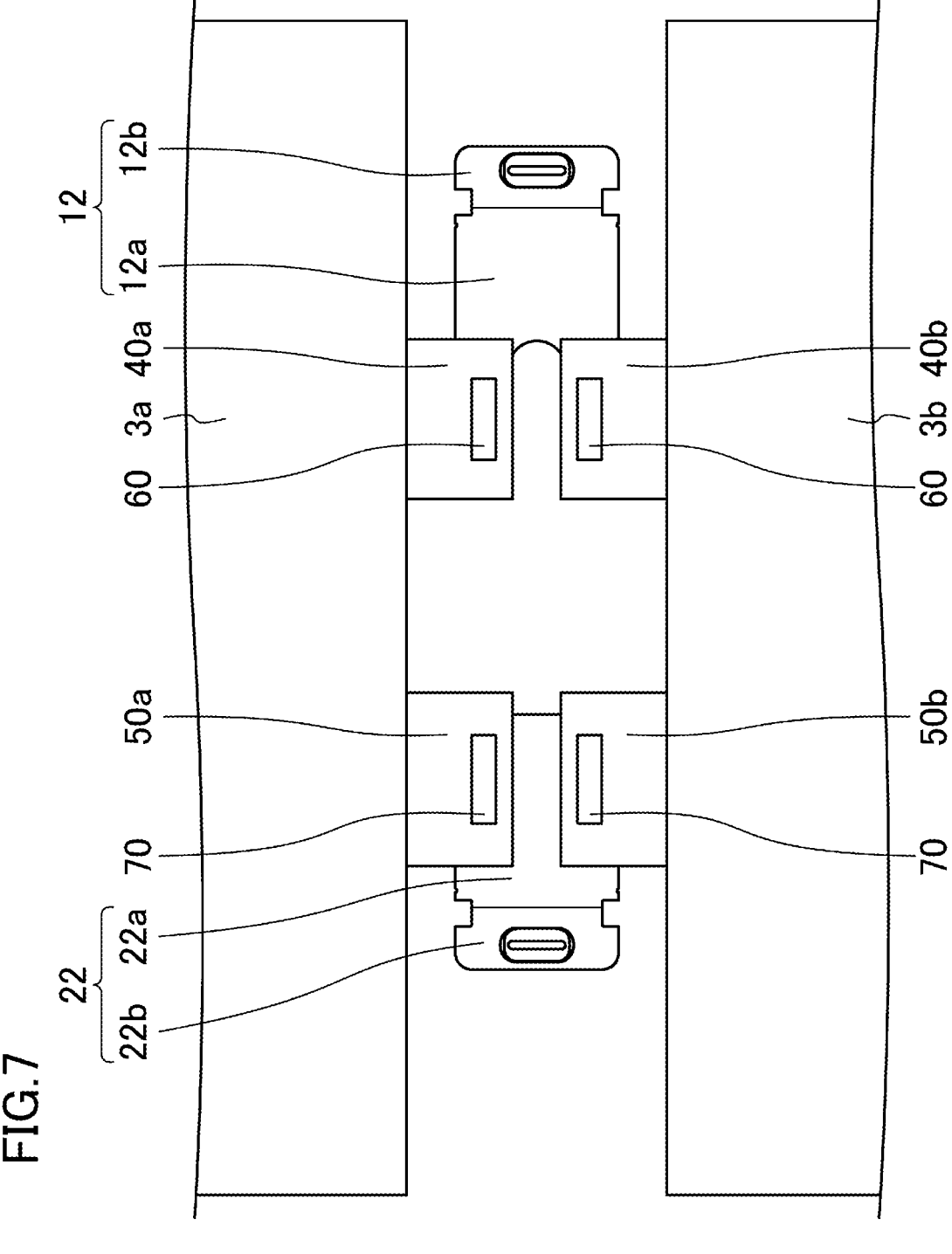
FIG. 7 is a plan view showing a state in which a positive electrode tab group and a negative electrode tab group are respectively connected to a positive electrode current collector and a negative electrode current collector.

FIG. 7 is a plan view showing a state in which the positive electrode tab groups 40*a*, 40*b* respectively provided at two electrode bodies 3*a*, 3*b* having the same configuration are connected to the positive electrode current collector 12, and the negative electrode tab groups 50*a*, 50*b* respectively provided at the two electrode bodies 3*a*, 3*b* are connected to the negative electrode current collector 22. The negative electrode current collector 22 has a first connection region 22*a* connected to the negative electrode tab group 50*a*, 50*b* and a second connection region 22*b* connected to the negative electrode connection member 21.

Specifically, as shown in FIG. 7, these two electrode bodies 3*a*, 3*b* are arranged such that the positive electrode tab groups 40*a*, 40*b* face each other and the negative electrode tab groups 50*a*, 50*b* face each other. Then, the positive electrode tab groups 40*a*, 40*b* are arranged on the first connection region 12*a* of the positive electrode current collector 12 to be welded to the positive electrode current collector 12 at a welding location 60, and the negative electrode tab groups 50*a*, 50*b* are arranged on the first connection region 22*a* of the negative electrode current collector 22 to be welded to the negative electrode current collector 22 at a welding location 70. Welding can be performed using, e.g., ultrasonic welding, resistance welding, or laser welding.

Note that the two electrode bodies 3*a*, 3*b* are housed in the exterior body 1 with the positive electrode tab groups 40*a*, 40*b* and the negative electrode tab groups 50*a*, 50*b* being bent and the electrode bodies 3*a*, 3*b* being arranged in parallel with each other.

Figure 8:
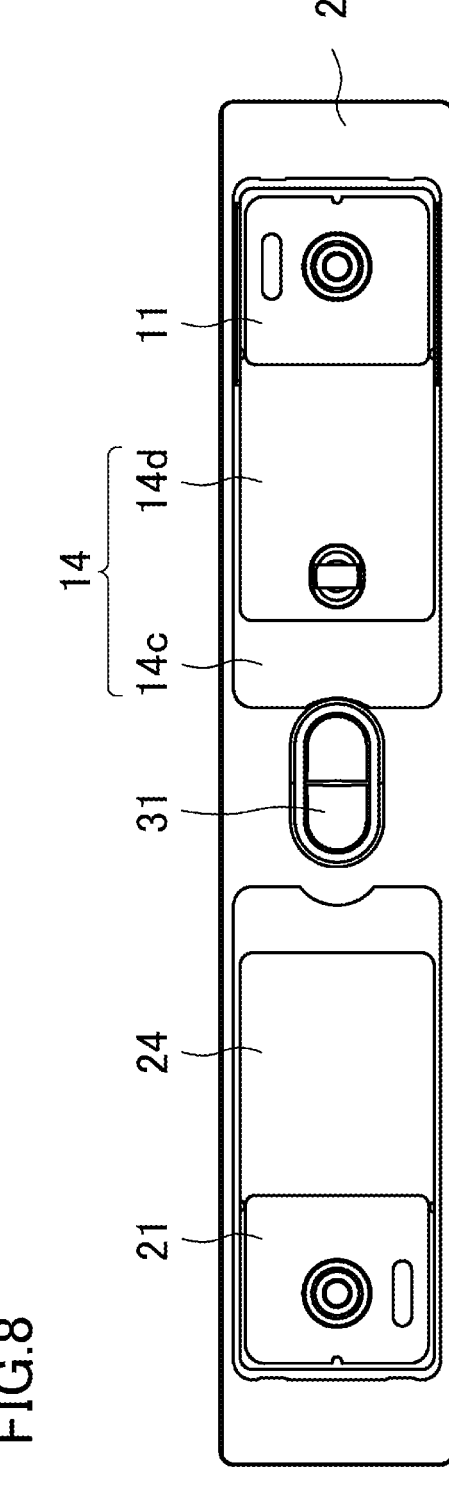
FIG. 8 is a plan view showing a state in which a positive electrode external terminal, a negative electrode external terminal, a positive electrode connection member, and a negative electrode connection member are assembled with a sealing plate.

FIG. 8 is a plan view showing, from the lower side of the sealing plate 2, a state in which the positive electrode external terminal 10, the negative electrode external terminal 20, the positive electrode connection member 11, and the negative electrode connection member 21 are assembled with the sealing plate 2.

Specifically, as shown in FIGS. 5 and 6, the upper insulating member 13, the sealing plate 2, the insulating member 14, and the positive electrode connection member 11 are arranged such that the positions of the through-holes 13*a*, 2*a*, 14*a*, and 11*a* respectively provided at the upper insulating member 13, the sealing plate 2, the insulating member 14, and the positive electrode connection member 11 are aligned with each other. Then, the protruding portion 10*a* of the positive electrode external terminal 10 is inserted into the through-holes 13*a*, 2*a*, 14*a*, and 11*a*, and a tip portion of the protruding portion 10*a* is crimped onto the positive electrode connection member 11 to fix the positive electrode external terminal 10 and the positive electrode connection member 11 to the sealing plate 2. Note that at the crimped portion, the positive electrode external terminal 10 and the positive electrode connection member 11 may be further welded to each other.

Note that the insulating member 14 has a recessed portion 14*d* and the positive electrode connection member 11 is fitted in the recessed portion 14*d*. Moreover, part of the recessed portion 14*d* is exposed through the positive electrode connection member 11, and the later-described positive electrode current collector 12 is fitted in such an exposed portion.

Figure 9:
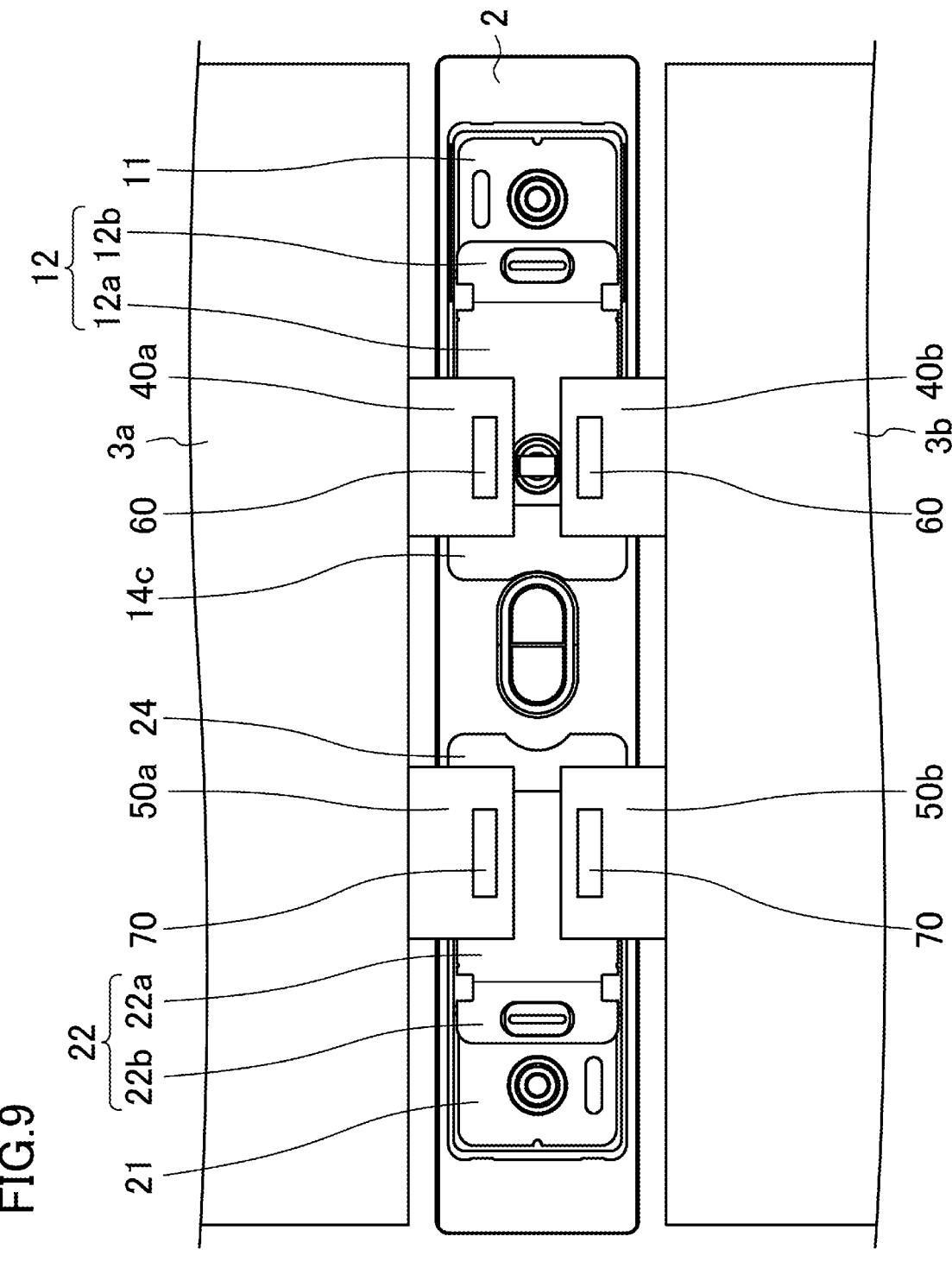
FIG. 9 is a plan view showing a state in which the positive electrode current collector and the negative electrode current collector in the state shown in FIG. 7 are respectively connected to the positive electrode connection member and the negative electrode connection member in the state shown in FIG. 8.

FIG. 9 is a plan view showing a state in which the positive electrode current collector 12 and the negative electrode current collector 22 in the state shown in FIG. 7 are respectively connected to the positive electrode connection member 11 and the negative electrode connection member 21 in the state shown in FIG. 8.

As shown in FIG. 9, the positive electrode current collector 12 is welded to the positive electrode connection member 11 at the second connection region 12*b* with the first connection region 12*a* being fitted in the recessed portion 14*d* of the insulating member 14. Welding can be performed using, e.g., laser welding.

As shown in FIGS. 3A, 3B, and 4A to 4C, the plurality of positive electrode current collector tabs 4*a* and the plurality of negative electrode current collector tabs 5*a* are formed in advance at the predetermined intervals at the end portions of the positive and negative electrode plates 4, 5 on one side so as to be stacked at predetermined positions when the positive electrode plate 4 and the negative electrode plate 5 are wound in the flat shape to form the electrode body 3. However, due to variation in the thicknesses of the positive electrode plate 4 and the negative electrode plate 5, the curvature of the electrode body 3, a pressing direction when the wound electrode body 3 is pressed in the flat shape, etc., these electrode tabs are stacked at positions shifted from the predetermined positions in some cases.

Figure 10:
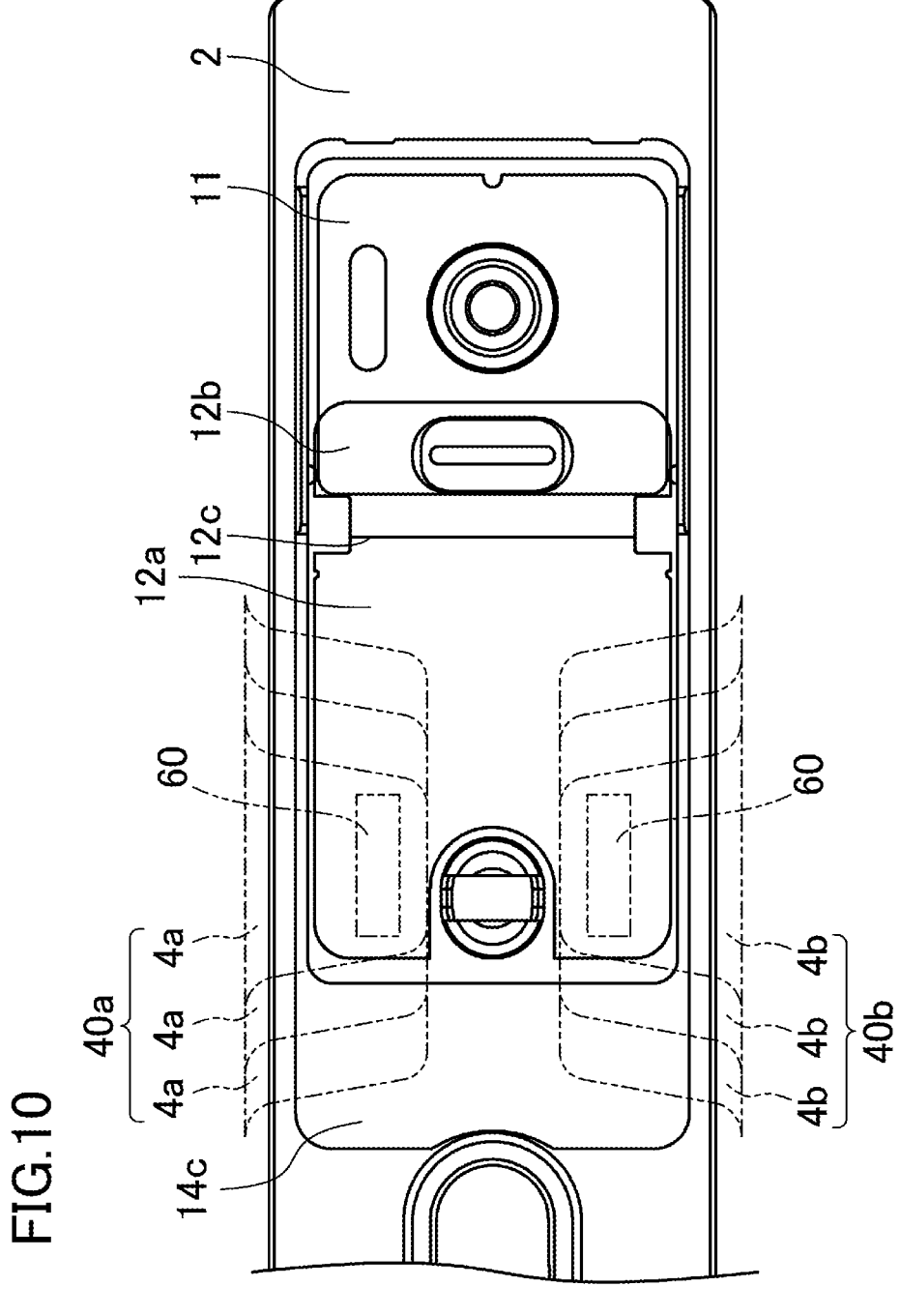
FIG. 10 is an enlarged plan view of a positive electrode side in FIG. 9.

FIG. 10 is an enlarged plan view of the positive electrode side in FIG. 9. Note that the electrode bodies 3a, 3b are not shown in FIG. 10.

As shown in FIG. 10, the plurality of positive electrode current collector tabs 4a, 4b forming the positive electrode tab groups 40a, 40b (three tabs are shown in FIG. 10) are stacked so as to be shifted from each other in the longitudinal direction of the sealing plate 2. Thus, the positive electrode tab groups 40a, 40b have such portions (projecting portions) that at least some of the positive electrode current collector tabs 4a, 4b project from the positive electrode current collector 12 (the first connection region 12a) in the longitudinal direction of the sealing plate 2.

Particularly, when the widths of the positive electrode current collector tabs 4a, 4b in the longitudinal direction of the sealing plate 2 are expanded for increasing the output of the secondary battery, the first connection region 12a of the positive electrode current collector 12 connected to the positive electrode tab groups 40a, 40b are also expanded. As a result, the positive electrode tab groups 40a, 40b are arranged close to the end of the positive electrode current collector 12 in the longitudinal direction, and for this reason, have more projecting portions. Moreover, also in a case where, in the first connection region 12a, a welding location 60 between the positive electrode current collector 12 and the positive electrode tab group 40a and a welding location 60 between the positive electrode current collector 12 and the positive electrode tab group 40b are positioned closer to the end of the positive electrode current collector 12 than the step portion 12c is, the positive electrode tab groups 40a, 40b have more projecting portions.

In the present embodiment, the insulating member 14 has an extending portion 14c extending between each projecting portion of the positive electrode tab groups 40a, 40b and the sealing plate 2 in the longitudinal direction of the sealing plate 2. Thus, the extending portion 14c also projects from the positive electrode current collector 12 in the longitudinal direction of the sealing plate 2.

According to the present embodiment, the extending portion 14c is provided at the insulating member 14 so that contact of the projecting portions of the positive electrode tab groups 40a, 40b with the sealing plate 2 can be prevented. Accordingly, a secondary battery can be provided, which has such a structure that insulation among the positive electrode tab groups 40a, 40b and the sealing plate 2 is maintained. Particularly, contact of the projecting portions of the positive electrode tab groups 40a, 40b with the sealing plate 2 can be prevented even when the widths of the positive electrode current collector tabs 4a, 4b in the longitudinal direction of the sealing plate 2 are expanded. Thus, a high-power secondary battery can be provided, which has such a structure that the insulation among the positive electrode tab groups 40a, 40b and the sealing plate 2 is maintained.

Note that in the present embodiment, the insulating member 24 on the negative electrode side has a similar configuration. Thus, a secondary battery can be provided, which has such a structure that insulation among the negative electrode tab groups 50a, 50b and the sealing plate 2 is maintained.

Figure 11:
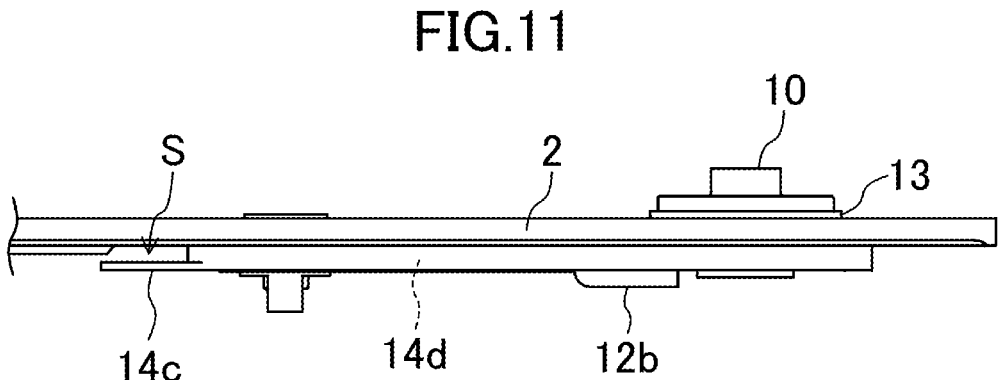
FIG. 11 is an enlarged side view of the positive electrode side in FIG. 9.
Figure 12:
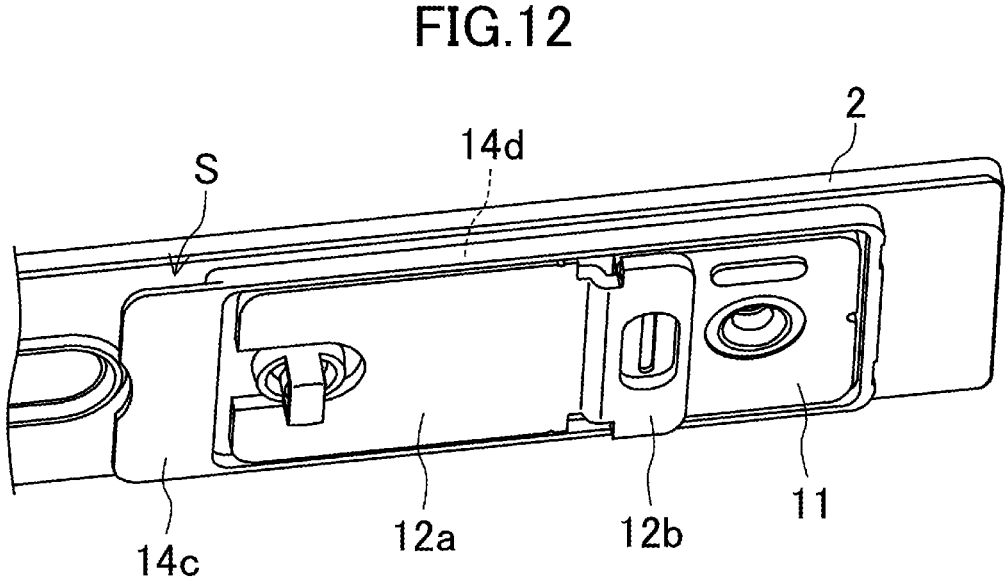
FIG. 12 is a perspective view from the lower side of the sealing plate in FIG. 9.

FIGS. 11 and 12 are an enlarged side view showing the positive electrode side in FIG. 9 and a perspective view from the lower side of the sealing plate 2. Note that in FIGS. 11 and 12, the electrode bodies 3a, 3b, the positive electrode tab groups 40a, 40b, and the negative electrode tab groups 50a, 50b are not shown.

As shown in FIGS. 11 and 12, the positive electrode current collector 12 is welded to the positive electrode connection member 11 with the first connection region 12a connected to the positive electrode tab groups 40a, 40b being fitted in the recessed portion 14d of the insulating member 14. The surface of the first connection region 12a on a side adjacent to an electrode body 3a, 3b is flush with the surface of the extending portion 14c of the insulating member 14 on the side adjacent to the electrode body 3a, 3b. With this configuration, an extra load on the positive electrode current collector tabs 4a, 4b can be prevented even when the positive electrode current collector tabs 4a, 4b are arranged over the positive electrode current collector 12 (the first connection region 12a) and the insulating member 14 (the extending portion 14c).

Moreover, as shown in FIGS. 11 and 12, a clearance S is provided between the sealing plate 2 and the extending portion 14c. This can reduce the weight and cost of the insulating member 14.

In the present embodiment, the first connection region 12a of the positive electrode current collector 12 is positioned closer to the sealing plate 2 than the second connection region 12b is as shown in FIG. 2. With this configuration, the end portion of the electrode body 3 adjacent to the sealing plate 2 can be positioned closer to the sealing plate 2. As a result, the capacity of the secondary battery can be further increased.

The present disclosure has been described above with reference to the preferred embodiment, but such description is not limited and various modifications can be made, needless to say.

For example, in the above-described embodiment, the positive electrode external terminal 10 and the positive electrode connection member 11 are formed as separate members, but may be integrally formed of the same member. Similarly, the negative electrode external terminal 20 and the negative electrode connection member 21 are formed as separate members, but may be integrally formed of the same member.

In the above-described embodiment, use of the electrode body 3a, 3b having the structure in which the positive electrode plate 4 and the negative electrode plate 5 are wound with the separator being interposed therebetween has been described. However, an electrode body having a structure in which a plurality of positive electrode plates and a plurality of negative electrode plates are stacked with a separator being interposed between adjacent ones of the plates may be used. This is because even in the electrode body having the multilayer structure, a plurality of current collector tabs provided at the positive and negative electrode plates are stacked so as to be shifted from each other and some of these tabs project from positive and negative current collectors in some cases.

In the above-described embodiment, the example where the two electrode bodies 3a, 3b are housed in the exterior body 1 has been described. However, one electrode body or three or more electrode bodies may be used.

The type of secondary battery in the present embodiment is not particularly limited. For example, the present disclosure can be applied to a non-aqueous electrolyte secondary battery such as a lithium ion secondary battery.

DESCRIPTION OF REFERENCE CHARACTERS

1 Exterior Body
2 Sealing Plate

2*b* Liquid Injection Hole
3, 3*a*, 3*b* Electrode Body
4 Positive Electrode Plate
4*a*, 4*b* Positive Electrode Current Collector Tab
5 Negative Electrode Plate
5*a*, 5*b* Negative Electrode Current Collector Tab
6 Electrode Body Holder
10 Positive Electrode External Terminal
10*a* Protruding Portion
11 Positive Electrode Connection Member
12 Positive Electrode Current Collector
12*a* First Connection Region
12*b* Second Connection Region
12*c* Step Portion
12*d* Cutout Portion
13, 23 Upper Insulating Member
13*a*, 2*a*, 14*a*, 11*a* Through-Hole
14, 24 Insulating Member
14*b* Opening
14*c* Extending Portion
14*d* Recessed Portion
20 Negative Electrode External Terminal
21 Negative Electrode Connection Member
22 Negative Electrode Current Collector
22*a* First Connection Region
30 Sealing Member
31 Gas Discharge Valve
40*a*, 40*b* Positive Electrode Tab Group
50*a*, 50*b* Negative Electrode Tab Group
60, 70 Welding Location
100 Secondary Battery The invention clamed is:

1. A secondary battery comprising:
an electrode body including a positive electrode plate and
a negative electrode plate;
an exterior body having an opening and housing the
electrode body;
a sealing plate sealing the opening;
an external positive terminal and an external negative
terminal provided outside the sealing plate, the external
positive terminal and the external negative terminal
being arranged along a longitudinal direction of the
sealing plate;
a connection member provided inside the sealing plate
and connected to one of the external positive terminal
or the external negative terminal;
an insulating member provided between the sealing plate
and the connection member; and
a current collector disposed inside the sealing plate and
connected to the connection member and a tab group
including a plurality of current collector tabs extending
from the positive electrode plate or the negative elec-
trode plate, wherein:
the sealing plate, the insulating member and the current
collector overlap each other along a stacked direction,
each of the plurality of current collector tabs partially
overlaps with an adjacent current collector tab with a
shift along the longitudinal direction,
at least some of the current collector tabs of the tab group
have a projecting portion extending from an inside of
the current collector to an outside of the current col-
lector and crossing an outermost peripheral end of the
current collector, in the longitudinal direction of the
sealing plate in a plan view which is viewed along the
stacked direction, and the insulating member has an extending portion at least
extending between the projecting portion and the seal-
ing plate along the longitudinal direction of the sealing
plate.
2. The secondary battery of claim 1, wherein
the current collector has a portion connected to the tab
group, and a surface of the portion of the current
collector on a side adjacent to the electrode body is
flush with a surface of the extending portion of the
insulating member on the side adjacent to the electrode
body.
3. The secondary battery of claim 1, wherein
a clearance gap is provided between the sealing plate and
the extending portion along the stacked direction.
4. The secondary battery of claim 1, wherein
the current collector has a first connection region con-
nected to the tab group and a second connection region
connected to the connection member, and has a step
portion between the first connection region and the
second connection region, and
the first connection region is positioned closer to the
sealing plate than the second connection region is.
5. The secondary battery of claim 4, wherein,
in the first connection region, a joint portion where the
current collector and the tab group are connected is
positioned closer to an end of the current collector than
the step portion is.
6. The secondary battery of claim 1, wherein
the one of the external positive terminal or the external
negative terminal and the connection member are inte-
grally formed of an identical member.
7. The secondary battery of claim 1, wherein
the electrode body has such a structure that the positive
electrode plate and the negative electrode plate are
wound with a separator being interposed between the
positive electrode plate and the negative electrode
plate.
8. The secondary battery of claim 1, wherein
the connection member includes a through hole into
which a protruding portion of the one of the external
positive terminal or the external negative terminal is
inserted.
9. The secondary battery of claim 1, wherein:
the current collector has a first connection region con-
nected to the tab group and a second connection region
connected to the connection member, and
the projecting portion extends beyond the outer peripheral
end of the second connection region opposite to the first
connection region in the longitudinal direction of the
sealing plate.
10. A secondary battery comprising:
an electrode body including a positive electrode plate and
a negative electrode plate;
an exterior body having an opening and housing the
electrode body;
a sealing plate sealing the opening;
an external positive terminal and an external negative
terminal provided outside the sealing plate, the external
positive terminal and the external negative terminal
being arranged along a longitudinal direction of the
sealing plate;
a current collector disposed inside the exterior body and
electrically connected to the external positive terminal
or the external negative terminal and a tab group
including a plurality of current collector tabs extending
from the positive electrode plate or the negative elec-
trode plate; and an insulating member provided between the sealing plate and the current collector, wherein:

the sealing plate, the insulating member and the current collector overlap each other along a stacked direction, each of the plurality of current collector tabs partially overlaps with an adjacent current collector tab with a shift along the longitudinal direction, at least some of the current collector tabs of the tab group have a projecting portion extending from an inside of the current collector to an outside of the current collector and crossing an outermost peripheral end of the current collector, in the longitudinal direction of the sealing plate in a plan view which is viewed along the stacked direction, and the insulating member has an extending portion at least extending between the projecting portion and the sealing plate along the longitudinal direction of the sealing plate.

* * * * *